US 8,225,295 B2

(12) United States Patent
Palsberg et al.

(10) Patent No.: US 8,225,295 B2
(45) Date of Patent: Jul. 17, 2012

(54) REGISTER ALLOCATION BY PUZZLE SOLVING

(76) Inventors: Jens Palsberg, Los Angeles, CA (US); Fernando M. Q. Pereira, Los Angeles, CA (US)

( * ) Notice: Subject to any disclaimer, the term of this patent is extended or adjusted under 35 U.S.C. 154(b) by 970 days.

(21) Appl. No.: 12/234,635

(22) Filed: Sep. 20, 2008

(65) Prior Publication Data
US 2009/0083721 A1 Mar. 26, 2009

Related U.S. Application Data

(60) Provisional application No. 60/974,358, filed on Sep. 21, 2007.

(51) Int. Cl.
*G06F 9/45* (2006.01)
(52) U.S. Cl. ......... 717/140; 717/152; 717/154; 717/159
(58) Field of Classification Search .................. None
See application file for complete search history.

(56) References Cited

U.S. PATENT DOCUMENTS

| | | | | |
|---|---|---|---|---|
| 5,774,730 A * | 6/1998 | Aizikowitz et al. | ............ | 717/157 |
| 5,778,233 A * | 7/1998 | Besaw et al. | ................... | 717/154 |
| 5,790,862 A * | 8/1998 | Tanaka et al. | .................. | 717/159 |
| 5,890,000 A * | 3/1999 | Aizikowitz et al. | ............ | 717/157 |
| 5,937,195 A * | 8/1999 | Ju et al. | .......................... | 717/156 |
| 5,946,490 A * | 8/1999 | Lieberherr et al. | ............ | 717/157 |
| 5,946,491 A * | 8/1999 | Aizikowitz et al. | ............ | 717/158 |
| 6,523,173 B1 * | 2/2003 | Bergner et al. | ................ | 717/152 |
| 6,651,247 B1 * | 11/2003 | Srinivasan | .................... | 717/161 |
| 6,925,639 B2 * | 8/2005 | Tarditi | ........................... | 717/159 |
| 7,197,639 B1 * | 3/2007 | Juels et al. | ..................... | 713/168 |
| 7,284,241 B2 * | 10/2007 | Heishi et al. | ................... | 717/152 |
| 7,305,665 B2 * | 12/2007 | Koseki et al. | .................. | 717/140 |
| 7,788,655 B2 * | 8/2010 | Plummer | ........................ | 717/152 |
| 8,104,026 B2 * | 1/2012 | Koseki et al. | ................. | 717/140 |
| 2002/0170044 A1 * | 11/2002 | Tarditi | ........................... | 717/154 |
| 2003/0079210 A1 * | 4/2003 | Markstein et al. | ............. | 717/152 |
| 2003/0177479 A1 * | 9/2003 | Koseki et al. | .................. | 717/140 |
| 2004/0025150 A1 * | 2/2004 | Heishi et al. | ................... | 717/154 |
| 2004/0154006 A1 * | 8/2004 | Heishi et al. | ................... | 717/140 |
| 2004/0226005 A1 * | 11/2004 | Tarditi | ........................... | 717/151 |
| 2005/0102658 A1 * | 5/2005 | Li et al. | .......................... | 717/140 |
| 2007/0022413 A1 * | 1/2007 | Sule et al. | ....................... | 717/140 |
| 2007/0277162 A1 * | 11/2007 | Tanaka et al. | .................. | 717/140 |
| 2008/0184211 A1 * | 7/2008 | Nickolls et al. | ............... | 717/140 |
| 2008/0184215 A1 * | 7/2008 | Baev et al. | ...................... | 717/155 |

(Continued)

OTHER PUBLICATIONS

Lee et al., Aliased Register Allocation for Straight-line Programs is NP-complete, published 2007, pp. 1-20.*

(Continued)

*Primary Examiner* — Thuy Dao
*Assistant Examiner* — Z. Wei
(74) *Attorney, Agent, or Firm* — Tong J. Lee

(57) ABSTRACT

We show that register allocation can be viewed as solving a collection of puzzles. We model the register file as a puzzle board and the program variables as puzzle pieces. We model pre-coloring by letting some of the puzzle pieces be already immovably placed on the puzzle board, and we model register aliasing by letting pieces have a plurality widths. For a wide variety of computer architectures, we can solve the puzzles in polynomial time. Puzzle solving is independent of spilling, that is, puzzle solving can be combined with a wide variety of approaches to spilling.

16 Claims, 15 Drawing Sheets

(a) The puzzles produced for the program. (b) An example solution. (c) The final program.

U.S. PATENT DOCUMENTS

2009/0064112 A1* 3/2009 Inagaki et al. .............. 717/140
2009/0193400 A1* 7/2009 Baev et al. .................. 717/140
2011/0138372 A1* 6/2011 Damron ....................... 717/154

OTHER PUBLICATIONS

Palsberg et al., Register Allocation After Classical SSA Elimination is NP-Complete, In Proceedings of FOSSACS'06, Foundations of Software Science and Computation Structures, published by Springer-Verlag Berlin Heidelberg 2006, pp. 79-93.*

Palsberg et al., Register Allocation via Coloring of Chordal Graphs, In Proceedings of APLAS'05, Asian Symposium on Programming Languages and Systems, publised 2005, pp. 1-15.*

Kong et al., Precise Register Allocation for Irregular Architectures, published 1998, pp. 297-307, Microarchitecture, 1998. MICRO-31. Proceedings. 31st Annual ACM/IEEE International Symposium.*

Ananian, "The static single information form", Massachusetts Institute of Technology, (Sep. 3, 1999), 1-95.

Appel, et al., "Optimal spilling for CISC machines with few registers", PLDI 2001, Snowbird, Utah, ACM, (2001), 243-253.

Belady, "A study of replacement algorithms for a virtual-storage computer", IBM Systems Journal, vol. 5, No. 2, (1966), 78-101.

Bodik, et al., "ABCD: Eliminating array-bounds checks on demand", University of Wisconsin; University of Arizona, IBM T.J. Watson Research Center, (2000), 13 pgs.

Bouchez, et al., "Register allocation: what does the NP-completeness proof of Chaitin et al. really prove? Or revisiting register allocation: why and how", LCPC 2006, LNCS 4382, Springer-Verlag Berlin Heidelberg, (2007), 283-298.

Briggs, et al., "Practical improvements to the construction and destruction of static single assignment form", Software—Practice and Experience, vol. 28, No. 8, (Jul. 1998), 1-28.

Budimlic, et al., "Fast copy coalescing and live-range identification", PLDI '02, Berlin, Germany, ACM, (2002), 8 pages.

Cytron, et al., "Efficiently computing static single assignment form and the control dependence graph", IBM Research Division; Brown University, (Mar. 1991), 1-52.

George, et al., "Iterated register coalescing", ACM Transactions on Programming Languages and Systems, vol. 18, No. 3, (May 1996), 300-324.

Grund, et al., "A fast cutting-plane algorithm for optimal coalescing". Dept. of Computer Science, Saarland University; University of Karlsruhe, (2007), 1-15.

Hames, et al., "Nearly optimal register allocation with PBQP", School of Information Technologies, The University of Sydney, (2006), 1-17.

Johnson, et al., "Dependence-based program analysis", ACM SIGPLAN '93, (Jun. 1993), 12 pages.

Koes, et al., "A global progressive register allocator", PLDI '06, Ottawa, Ontario, Canada, ACM, (Jun. 2006), 204-215.

Lattner, et al., "LLVM: A compilation framework for lifelong program analysis & transformation", Proceedings of the International Symposium on Code Generation and Optimization, (2004), 12 pages.

Poletto, et al., "Linear scan register allocation", ACM Transactions on Programming Languages and Systems, vol. 21, No. 5, (Sep. 1999), 895-913.

Scholz, et al., "Register allocation for irregular architectures", LCTES '02—SCOPES '02, Berlin, Germany, (2002), 139-148.

Smith, et al., "A generalized algorithm for graph-coloring register allocation", PLDI '04, Washington, DC, ACM, (2004), 277-288.

Sreedhar, et al., "Translating out of static single assignment form", A. Cortesi, G. File (Eds.): SAS '99, LNCS 1694, (1999), 194-210.

* cited by examiner

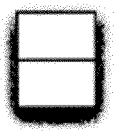
Figure 1: Three types of puzzles.

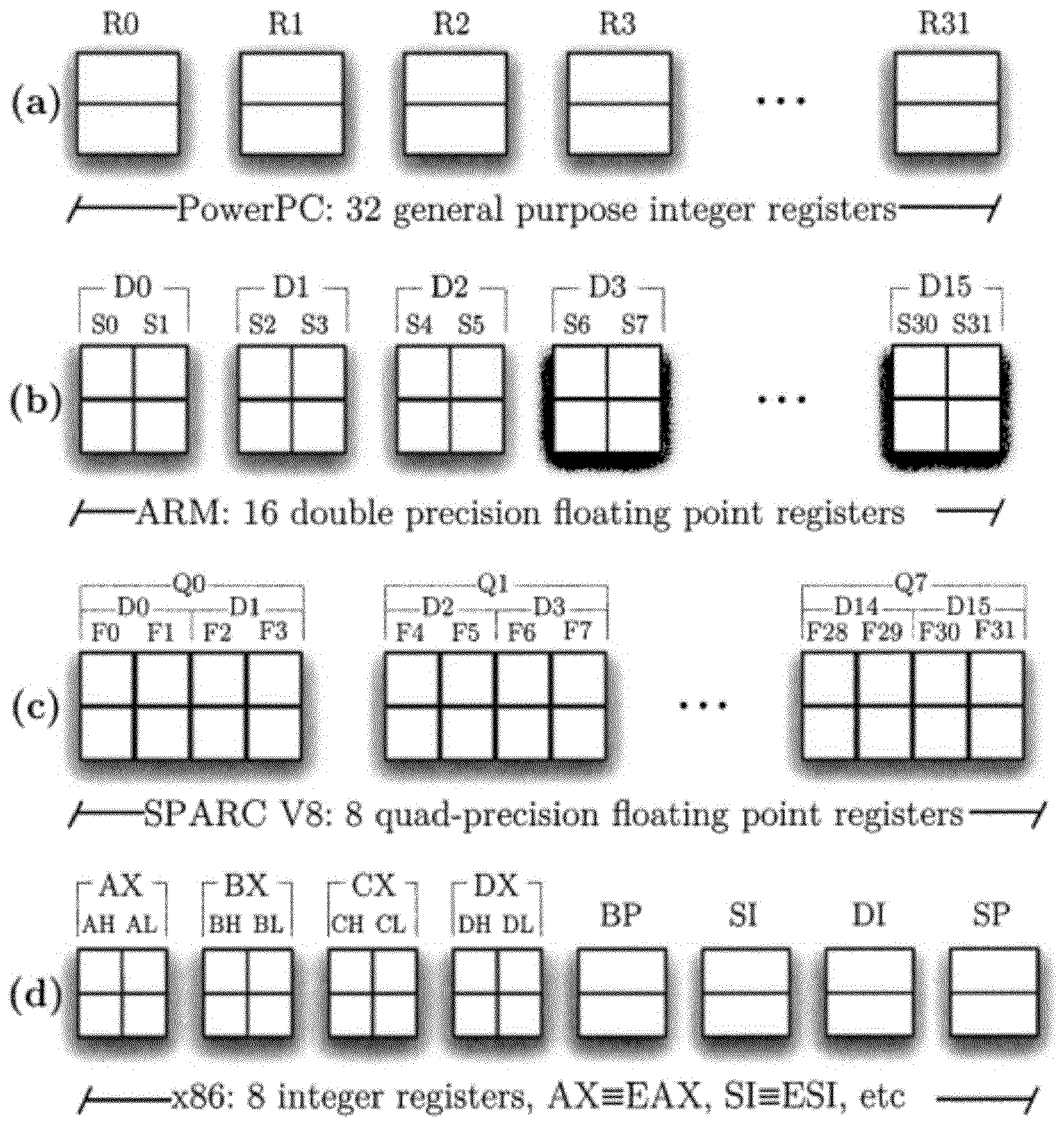
Figure 2: Examples of register banks mapped in puzzle boards.

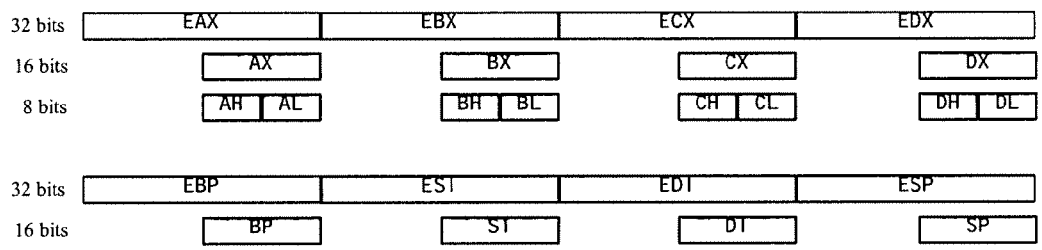
Figure 3: General purpose registers of the x86 architecture

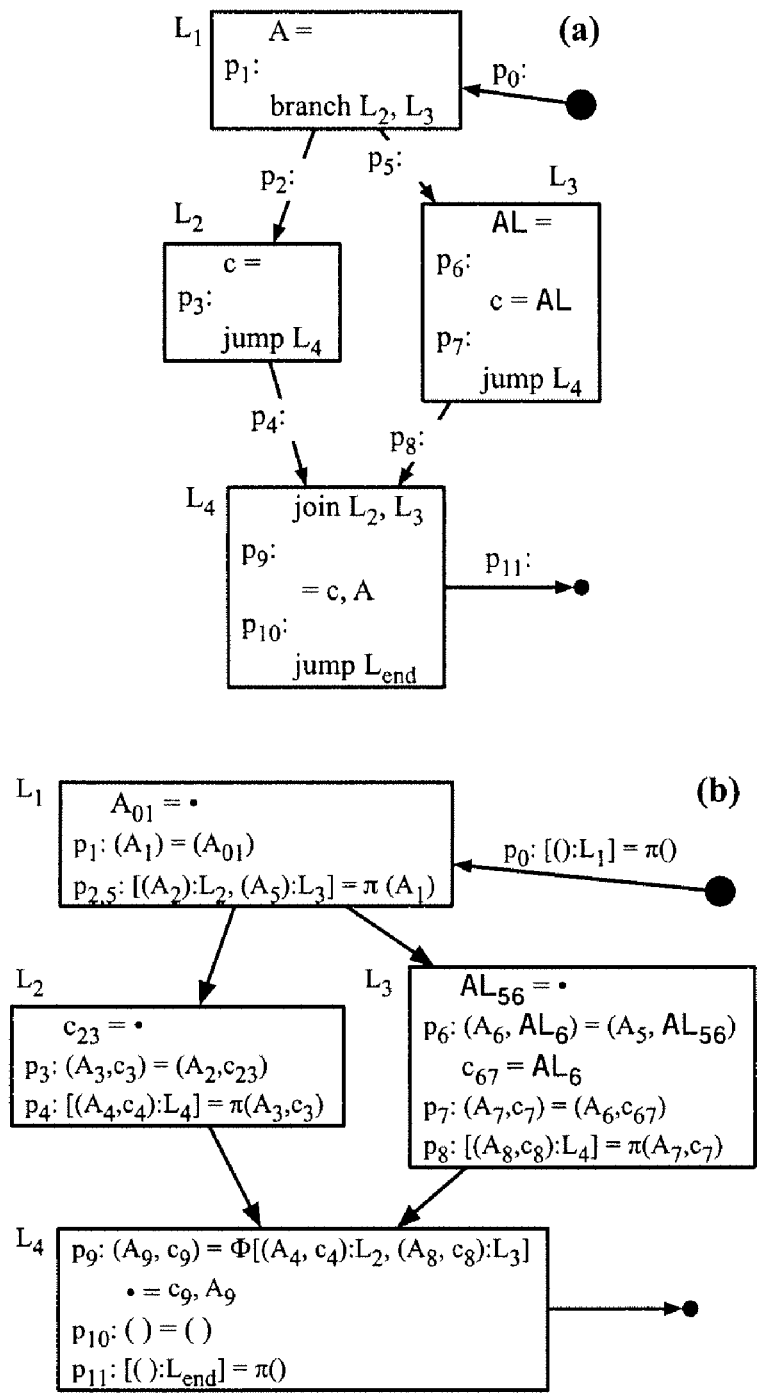
Figure 4: (a) Original program. (b) Elementary program.

Figure 5: Mapping program variables to puzzle pieces.

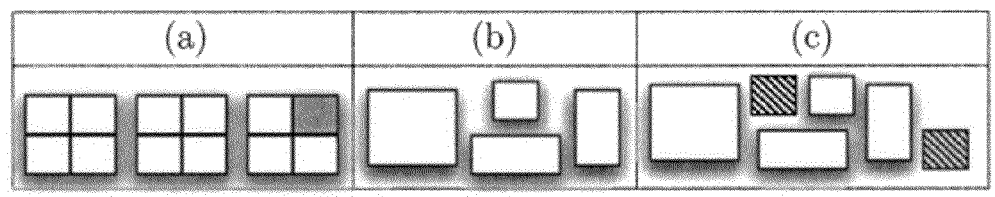
Figure 6: Padding: (a) puzzle board, (b) pieces before padding, (c) pieces after padding. The new pieces are marked with stripes.

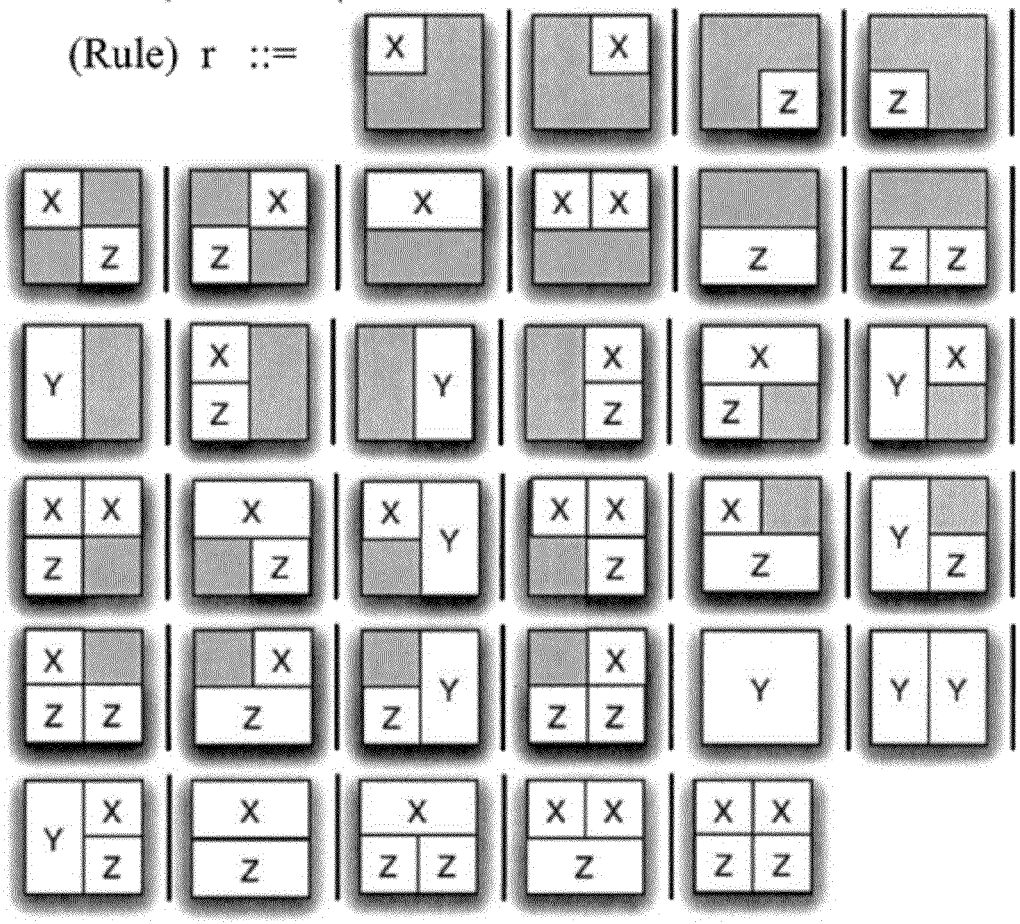
Figure 7: A visual language for programming puzzle solvers.

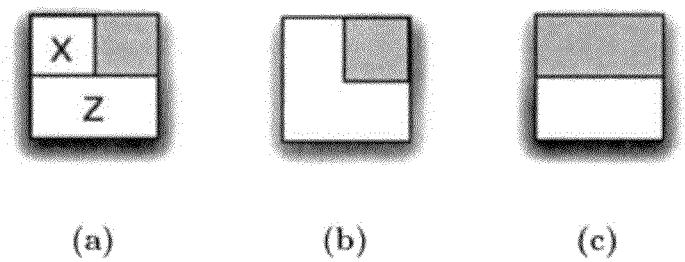
Figure 8: (a) Example rule. (b) Example area. (c) Another example area.

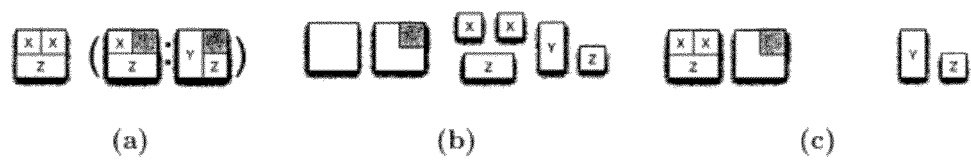
Figure 9: (a) Example program. (b) Example puzzle. (c) Puzzle after executing one statement.

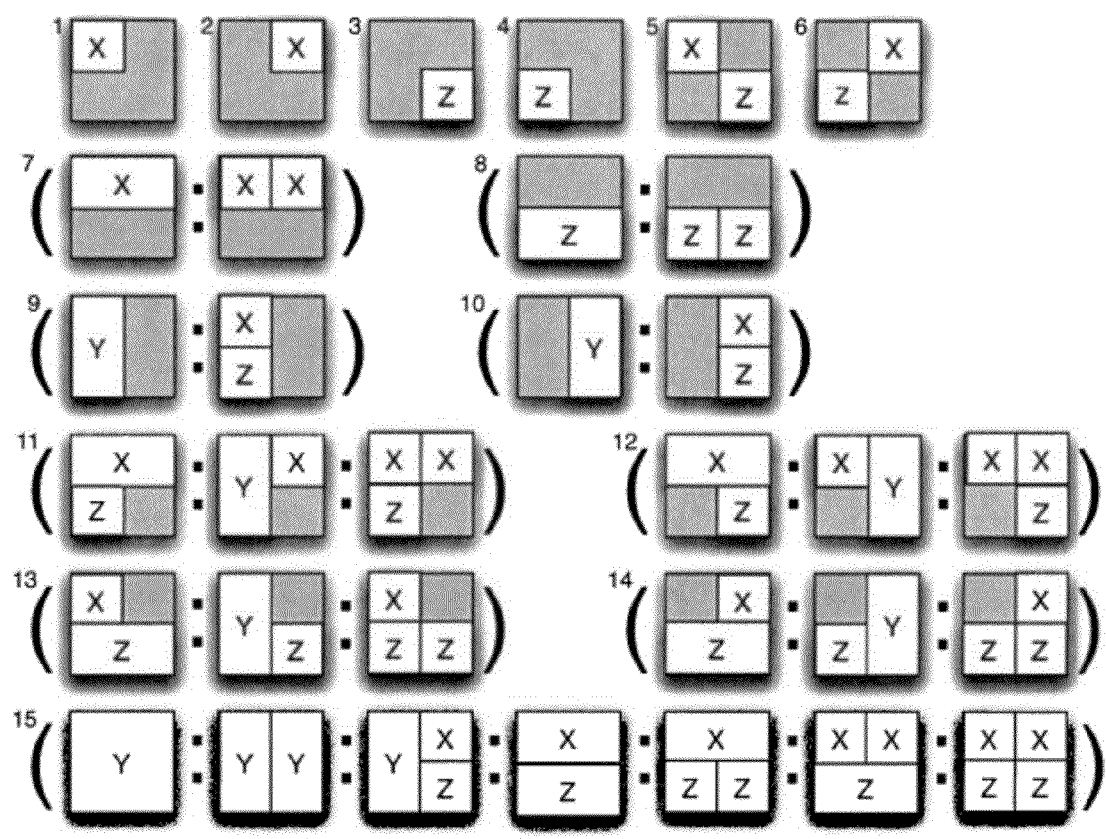
Figure 10: Our puzzle solving program

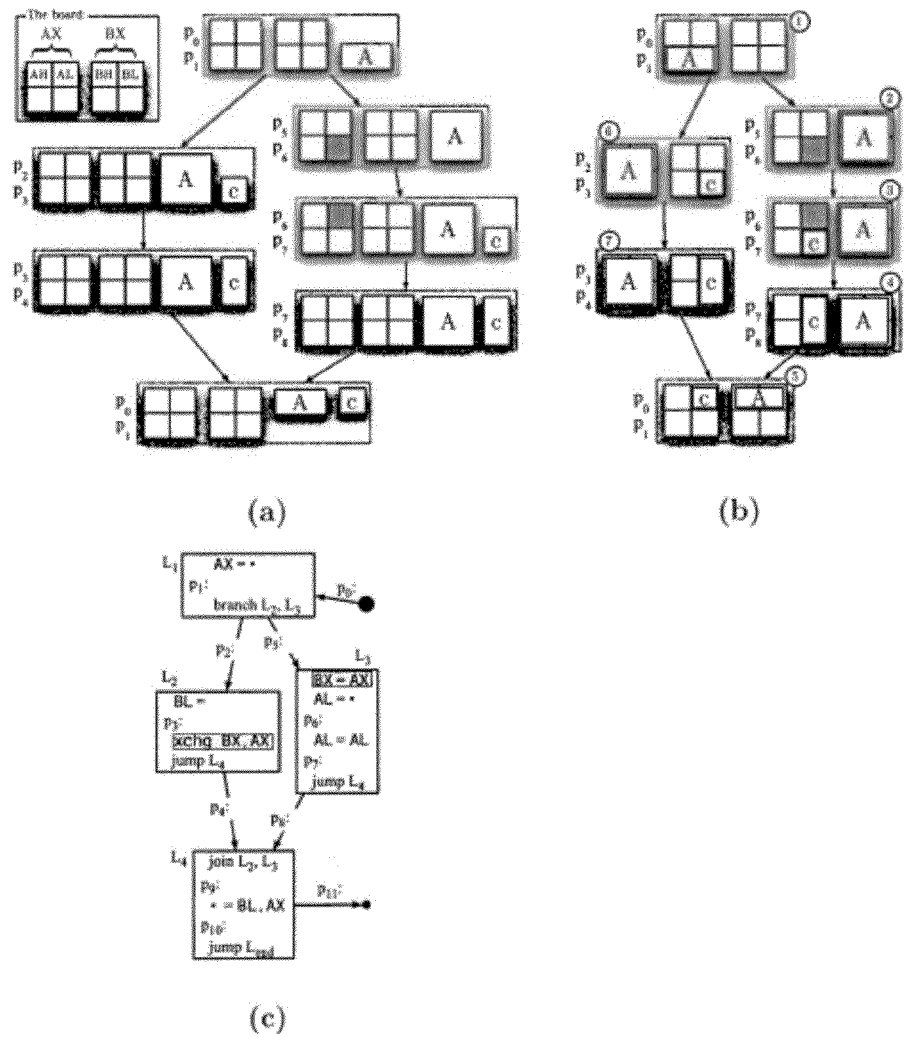
Figure 11: (a) The puzzles produced for the program given in Figure 4(b). (b) An example solution. (c) The final program.

|     | Benchmark   | LoC     | asm        | btcode    |
| --- | ----------- | ------- | ---------- | --------- |
| gcc | 176.gcc     | 224,099 | 12,868,208 | 2,195,700 |
| plk | 253.perlbmk | 85,814  | 7,010,809  | 1,268,148 |
| gap | 254.gap     | 71,461  | 4,256,317  | 702,843   |
| msa | 177.mesa    | 59,394  | 3,820,633  | 547,825   |
| vtx | 255.vortex  | 67,262  | 2,714,588  | 451,516   |
| twf | 300.twolf   | 20,499  | 1,625,861  | 324,346   |
| crf | 186.crafty  | 21,197  | 1,573,423  | 288,488   |
| vpr | 175.vpr     | 17,760  | 1,081,883  | 173,475   |
| amp | 188.ammp    | 13,515  | 875,786    | 149,245   |
| prs | 197.parser  | 11,421  | 904,924    | 163,025   |
| gzp | 164.gzip    | 8,643   | 202,640    | 46,188    |
| bz2 | 256.bzip2   | 4,675   | 162,270    | 35,548    |
| art | 179.art     | 1,297   | 91,078     | 40,762    |
| eqk | 183.equake  | 1,540   | 91,018     | 45,241    |
| mcf | 181.mcf     | 2.451   | 60,225     | 34,021    |

Figure 12: Benchmark characteristics. LoC: number of lines of C code. asm: size of x86 assembly programs produced by LLVM with our algorithm (bytes). btcode: program size in LLVM's intermediate representation (bytes).

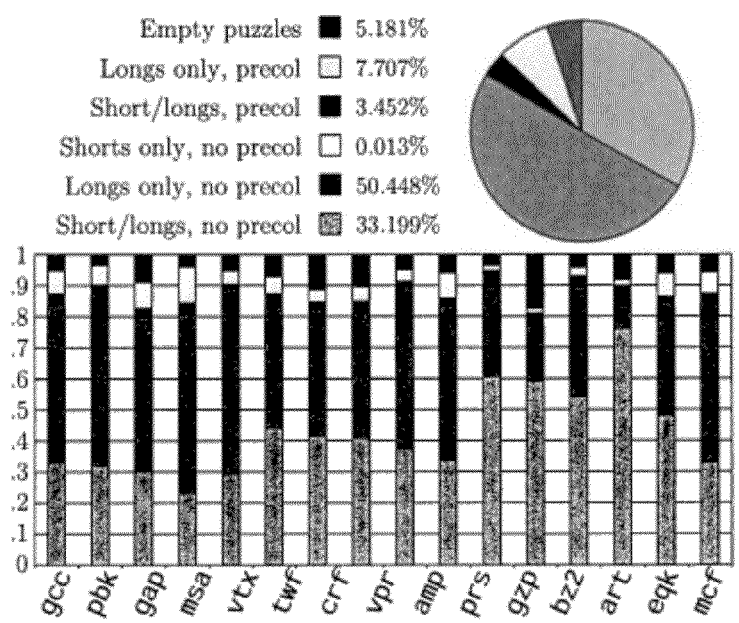
Figure 13: The distribution of the 1,486,301 puzzles generated from SPEC CPU2000.

| Benchmark | #puzzles | avg | max | once |
|---|---|---|---|---|
| gcc | 476,649 | 1.03 | 4 | 457,572 |
| perlbmk(plk) | 265,905 | 1.03 | 4 | 253,563 |
| gap | 158,757 | 1.05 | 4 | 153,394 |
| mesa | 139,537 | 1.08 | 9 | 125,169 |
| vortex(vtx) | 116,496 | 1.02 | 4 | 113,880 |
| twolf(twf) | 60,969 | 1.09 | 9 | 52,443 |
| crafty(crf) | 59,504 | 1.06 | 4 | 53,384 |
| vpr | 36,561 | 1.10 | 10 | 35,167 |
| ammp(amp) | 33,381 | 1.07 | 8 | 31,853 |
| parser(prs) | 31,668 | 1.04 | 4 | 30,209 |
| gzip(gzp) | 7,550 | 1.06 | 3 | 6,360 |
| bzip2(bz2) | 5,495 | 1.09 | 3 | 4,656 |
| art | 3,552 | 1.08 | 4 | 3,174 |
| equake(eqk) | 3,365 | 1.11 | 8 | 2,788 |
| mcf | 2,404 | 1.05 | 3 | 2,120 |
|  | 1,401,793 | 1.05 | 10 | 1,325,732 |

Figure 14: Number of calls to the puzzle solver per nonempty puzzle. #puzzles: number of nonempty puzzles. avg and max: average and maximum number of times the puzzle solver was used per puzzle. once: number of puzzles for which the puzzle solver was used only once.

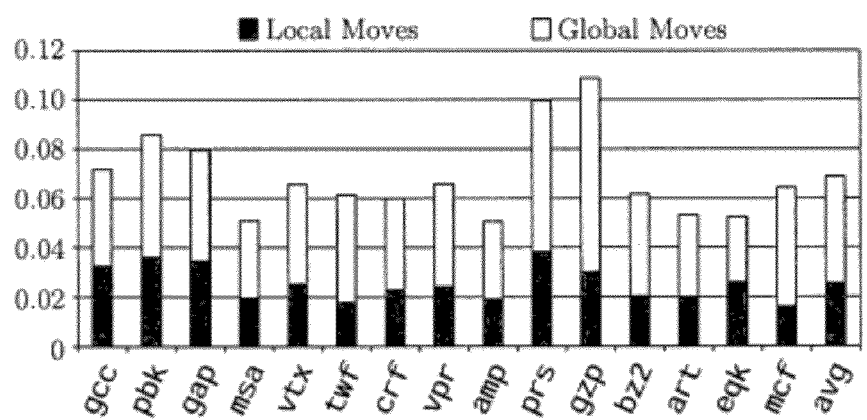
Figure 15: Number of copy and swap instructions inserted per puzzle.

REGISTER ALLOCATION BY PUZZLE SOLVING

CROSS-REFERENCE TO RELATED APPLICATIONS

This application claims the benefit of U.S. Provisional Application No. 60/974,358, filed on Sep. 21, 2007.

FIELD OF THE INVENTION

The present invention relates generally to software designs. More particularly, this invention relates to compiler designs. Even more particularly, this invention relates to register allocation.

BACKGROUND

In a compiler, register allocation is the problem of mapping program variables to machine registers for the purpose of fast execution. Researchers and compiler writers have used a variety of approaches to model register allocation, including graph coloring [9, 17], integer linear programming [2, 10], partitioned Boolean quadratic optimization [16, 11], and multi-commodity network flow [13]. These approaches represent different tradeoffs between compilation speed and quality of the produced code. For example, linear scan [15] is a simple algorithm based on the coloring of interval graphs that produces code of reasonable quality with fast compilation time; iterated register coalescing [9] is a more complicated algorithm that, although slower, tends to produce code of better quality than linear scan. Finally, the Appel-George algorithm [2] achieves optimal spilling with respect to a cost model in worst-case exponential time via integer linear programming.

BRIEF DESCRIPTION OF THE DRAWINGS

Embodiments are illustrated by way of example and not by way of limitation in the figures of the accompanying drawings, in which like references indicate similar elements. It should be noted that references to "an" or "one" embodiment in this disclosure are not necessarily to the same embodiment, and such references mean at least one.

FIG. 1 illustrates three types of puzzles.

FIG. 2 illustrates examples of register banks mapped in puzzle boards.

FIG. 3 illustrates the general purpose registers of the x86 architecture.

FIGS. 4(a) and 4(b) illustrate a program in original form and in elementary form.

FIG. 5 illustrates how we map program variables to puzzle pieces.

FIGS. 6(a), 6(b), and 6(c) illustrate padding of a puzzle.

FIG. 7 illustrates a visual language for programming puzzle solvers.

FIGS. 8(a), 8(b), and 8(c) illustrate an example rule, an example area, and another example area.

FIGS. 9(a), 9(b), and 9(c) illustrate an example program, an example puzzle, and the puzzle after executing one statement of the program.

FIG. 10 illustrates an embodiment of our puzzle solving program.

FIG. 11(a), 11(b), 11(c) illustrate the puzzles produced for the program given in FIG. 4(b), an example solution, and the final program.

FIG. 12 illustrate the benchmark characteristics.

FIG. 13 illustrates the distribution of the 1,486,301 puzzles generated from SPEC CPU2000.

FIG. 14 illustrates the number of calls to the puzzle solver per nonempty puzzle.

FIG. 15 illustrates the number of copy and swap instructions inserted per puzzle.

DETAILED DESCRIPTION

A method and system for register allocation is described herein. We show that register allocation can be viewed as solving a collection of puzzles. We model the register file as a puzzle board and the program variables as puzzle pieces. We model pre-coloring by letting some of the puzzle pieces be already immovably placed on the puzzle board, and we model register aliasing by letting pieces have a plurality widths. For a wide variety of computer architectures (illustratively, PowerPC, x86, StrongARM, etc.), we can solve the puzzles in polynomial time. Puzzle solving is independent of spilling, that is, puzzle solving can be combined with a wide variety of approaches to spilling. Generally, either a compiler is fast and produces slow code, or it is slow and produces fast code. A compiler that uses register allocation by puzzle solving can both be fast and produce competitive code.

We introduce a novel approach: register allocation by puzzle solving. We model the register file as a puzzle board and the program variables as puzzle pieces. The result is a collection of puzzles with one puzzle per instruction in the intermediate representation of the source program. We will show that puzzles are easy to use, that we can solve them efficiently, and that they produce code that is competitive with state-of-the-art algorithms. Specifically, we will show how for a wide variety of computer architectures (illustratively, PowerPC, x86, StrongARM, etc.), we can solve each puzzle in linear time in the number of registers, how we can extend the puzzle solver with a simple heuristic for spilling, and how pre-coloring and register aliasing fit in naturally. Pre-colored variables are variables that have been assigned to particular registers before register allocation begins; two register names alias [17] when an assignment to one register name can affect the value of the other.

We have implemented a puzzle-based register allocator. Our register allocator has four main operations:
1. transform the program into an elementary program;
2. transform the elementary program into a collection of puzzles;
3. do puzzle solving, spilling, and coalescing; and finally
4. transform the elementary program and the register allocation result into assembly code.

One key insight of the puzzles approach lies in the use of elementary programs. An elementary program enables us to define and solve one puzzle for each instruction in the program.

Puzzles

A puzzle consists of a board and a set of pieces. Pieces cannot overlap on the board, and a subset of the pieces are already placed on the board. The challenge is to fit the remaining pieces on the board.

We will now explain how to map a register file to a puzzle board and how to map program variables to puzzle pieces. Every resulting puzzle will be of one of the three types illustrated in FIG. 1 or a hybrid.

Let us first explain how to map a register file to a puzzle board. The bank of registers in the target architecture determines the shape of the puzzle board. Every puzzle board has a number of separate areas, where each area is divided into two rows of squares. We will explain later why an area has exactly two rows. The register file may support aliasing, which determines the number of columns in each area, the valid shapes of the pieces, and the rules for placing the pieces on the board. We distinguish three types of puzzles: type-0, type-1 and type-2, where each area of a type-i puzzle has $2^i$ columns.

Type-0 puzzles. The bank of registers used in PowerPC and the bank of integer registers used in the ARM architecture are simple cases because they do not support register aliasing. FIG. 2(a) shows the puzzle board for PowerPC. Every area has just one column that corresponds to one of the 32 registers. Both PowerPC and ARM give a type-0 puzzle for which the pieces are of the three kinds shown in FIG. 1. We can place an X-piece on any square in the upper row, we can place a Z-piece on any square in the lower row, and we can place a Y-piece on any column. Our approach to solving Type-1 puzzles can also be used to solve Type-0 puzzles.

Type-1 puzzles. FIG. 2(b) shows the puzzle board for the floating point registers used in the ARM architecture. This register bank has 32 single precision registers that can be combined into 16 pairs of double precision registers. Thus, every area of this puzzle board has two columns, which correspond to the two registers that can be paired. For example, the 32-bit registers S0 and S1 are in the same area because they can be combined into the 64-bit register D0. Similarly, because S1 and S2 cannot be combined into a double register, they denote columns in different areas. ARM gives a type-1 puzzle for which the pieces are of the six kinds shown in FIG. 1. We define the size of a piece as the number of squares that it occupies on the board. We can place a size-1 X-piece on any square in the upper row, a size-2 X-piece on the two upper squares of any area, a size-1 Z-piece on any square in the lower row, a size-2 Z-piece on the two lower squares of any area, a size-2 Y-piece on any column, and a size-4 Y-piece on any area. We will later explain how to solve a type-1 puzzle in linear time in the number of areas.

Type-2 puzzles. SPARC V8 supports two levels of register aliasing: first, two 32-bit floating-point registers can be combined to hold a single 64-bit value; then, two of these 64-bit registers can be combined yet again to hold a 128-bit value. FIG. 2(c) shows the puzzle board for the floating point registers of SPARC V8. Every area has four columns corresponding to four registers that can be combined. This architecture gives a type-2 puzzle for which the pieces are of the nine kinds shown in FIG. 1. The rules for placing the pieces on the board are an extension of the rules for type-1 puzzles. Importantly, we can place a size-2 X-piece on either the first two squares in the upper row of an area, or on the last two squares in the upper row of an area. A similar rule applies to size-2 Z-pieces. Solving type-2 puzzles remains an open problem.

Hybrid puzzles. The x86 gives a hybrid of type-0 and type-1 puzzles. FIG. 3 shows the integer-register file of the x86, and FIG. 2(d) shows the corresponding puzzle board. The registers AX, BX, CX, DX give a type-1 puzzle, while the registers EBP, ESI, EDI, ESP give a type-0 puzzle. We treat the EAX, EBX, ECX, EDX registers as special cases of the AX, BX, CX, DX registers; values in EAX, EBX, ECX, EDX take up to 32 bits rather than 16 bits. Notice that x86 does not give a type-2 puzzle because even though we can fit four 8-bit values into a 32-bit register, x86 does not provide register names for the upper 16-bit portion of that register. For a hybrid of type-1 and type-0 puzzles, we first solve the type-0 puzzles and then the type-1 puzzles.

The floating point registers of SPARC V9 give a hybrid of a type-2 and a type-1 puzzle because half the registers can be combined into quad precision registers.

Let us now explain how to map program variables to puzzle pieces. We map program variables to puzzle pieces in a two-step process: first we convert a source program into an elementary program and then we map the elementary program into puzzle pieces.

From a source program to an elementary program. We can convert an ordinary program into an elementary program in three steps. First, we transform the source program to static single assignment (SSA) form by renaming variables and adding φ-functions at the beginning of each basic block [8]. Second, we transform the SSA-form program into static single information (SSI) form [1]. In our flavor of SSI form, every basic block ends with a π-function that renames the variables that are live going out of the basic block. (The name π-assignment was coined by Bodik et al. [4]. It was originally called σ-function in [1], and switch operators in [12].) Finally, we transform the SSI-form program into an elementary program by inserting a parallel copy between each pair of consecutive instructions in a basic block, and renaming the variables alive at that point. Appel and George used the idea of inserting parallel copies everywhere in their ILP-based approach to register allocation with optimal spilling [2]. In summary, in an elementary program, every basic block begins with a φ-function, has a parallel copy between each consecutive pair of instructions, and ends with a π-function. FIG. 4(a) shows a program, and FIG. 4(b) gives the corresponding elementary program. As an optimization, we have removed useless φ-functions from the beginning of blocks with a single predecessor. We adopt the convention that lower case letters denote variables that can be stored into a single register, and upper case letters denote variables that must be stored into a pair of registers. Names in typewriter font, e.g., AL, denote pre-colored registers.

Cytron et al. [8] gave a polynomial time algorithm to convert a program into SSA form, and Ananian [1] gave a polynomial time algorithm to convert a program into SSI form. We can implement the remaining step of inserting parallel copies such that it runs in polynomial time as well using known techniques based on algorithms and data structures.

From an elementary program to puzzle pieces. A program point [2] is a point between any pair of consecutive instructions. For example, the program points in FIG. 4(b) are $p_0, \ldots, p_{11}$. The collection of program points where a variable v is alive constitutes its live range. The live ranges of programs in elementary form contain at most two program points. A variable v is said to be live-in at instruction i if its live range contains a program point that precedes i; v is live-out at i if v's live range contains a program point that succeeds i. For each instruction i in an elementary program we create a puzzle that has one piece for each variable that is live in or live out at i (or both). The live ranges that end in the middle become X-pieces; the live ranges that begin in the middle become Z-pieces; and the long live ranges become Y-pieces. FIG. 5 gives an example of a program fragment that uses six variables, and it shows their live ranges and the resulting puzzles.

We can now explain why each area of a puzzle board has exactly two rows. We can assign a register both to one live range that ends in the middle and to one live range that begins in the middle. We model that by placing an X-piece in the upper row and a Z-piece right below in the lower row. However, if we assign a register to a long live range, then we cannot assign that register to any other live range. We model that by placing a Y-piece, which spans both rows.

The sizes of the pieces are given by the types of the variables. For example, for x86, an 8-bit variable with a live range that ends in the middle becomes a size-1 X-piece, while a 16 or 32-bit variable with a live range that ends in the middle becomes a size-2 X-piece. Similarly, an 8-bit variable with a live range that begins in the middle becomes a size-1 Z-piece. while a 16 or 32-bit variable with a live range that ends in the middle becomes a size-2 Z-piece. An 8-bit variable with a long live range becomes a size-2 Y-piece, while a 16-bit variable with a long live range becomes a size-4 Y-piece.

The core register allocation problem, also known as spill-free register allocation, is: given a program P and a number K of available registers, can each of the variables of P be mapped to one of the K registers such that variables with interfering live ranges are assigned to different registers? In case some of the variables are pre-colored, we call the problem spill-free register allocation with pre-coloring.

We have discovered and proved: Theorem (Equivalence) Spill-free register allocation with pre-coloring for an elementary program is equivalent to solving a collection of puzzles.

FIG. 11(a) shows the puzzles produced for the program in FIG. 4(b).

Solving Type-1 Puzzles

FIG. 10 shows our algorithm for solving type-1 puzzles. Our algorithmic notation is visual rather than textual. We will first define a visual language of puzzle solving programs that includes the program in FIG. 10. After explaining the semantics of the whole language, we then focus on the program in FIG. 10.

We will study puzzle-solving programs that work by completing one area at a time. To enable that approach, we may have to pad a puzzle before the solution process begins. If a puzzle has a set of pieces with a total area that is less than the total area of the puzzle board, then a strategy that completes one area at a time may get stuck unnecessarily because of a lack of pieces. So, we pad such puzzles by adding size-i X-pieces and size-1 Z-pieces, until these two properties are met: (i) the total area of the X-pieces equals the total area of the Z-pieces; (ii) the total area of all the pieces is 4K, where K is the number of areas on the board. Note that total area includes also pre-colored squares. FIG. 6 illustrates padding. A puzzle is solvable if and only if its padded version is solvable.

We will now present a visual language of puzzle solving programs. We say that an area is complete when all four of its squares are covered by pieces; dually, an area is empty when none of its four squares are covered by pieces.

The grammar in FIG. 7 defines a visual language for programming type-1 puzzle solvers: a program is a sequence of statements, and a statement is either a rule r or a conditional statement r:s. We now informally explain the meaning of rules, statements, and programs.

Rules. A rule explains how to complete an area. We write a rule as a two-by-two diagram with two facets: a pattern, that is, dark areas which show the squares (if any) that have to be filled in already for the rule to apply; and a strategy, that is, a description of how to complete the area, including which pieces to use and where to put them. We say that the pattern of a rule matches an area a if the pattern is the same as the already-filled-in squares of a. For a rule r and an area a where the pattern of r matches a, the application of r to a succeeds, if the pieces needed by the strategy of r are available, the result is that the pieces needed by the strategy of r are placed in a;

the application of r to a fails otherwise.

For example, the rule in FIG. 8(a) has a pattern consisting of just one square—namely, the square in the top-right corner, and a strategy consisting of taking one size-1 X-piece and one size-2 Z-piece and placing the X-piece in the top-left corner and placing the Z-piece in the bottom row. If we apply the rule to the area in FIG. 8(b) and one size-1 X-piece and one size-2 Z-piece are available, then the result is that the two pieces are placed in the area, and the rule succeeds. Otherwise, if one or both of the two needed pieces are not available, then the rule fails. We cannot apply the rule to the area in FIG. 8(c) because the pattern of the rule does not match the area.

Statements. For a statement that is simply a rule r, we have explained above how to apply r to an area a where the pattern of r matches a. For a conditional statement r:s, we require all the rules in r:s to have the same pattern, which we call the pattern of r:s. For a conditional statement r:s and an area a where the pattern of r:s matches a, the application of r:s to a proceeds by first applying r to a; if that application succeeds, then r:s succeeds (and s is ignored); otherwise the result of r:s is the application of the statement s to a.

Programs. The execution of a program $s_1 \ldots s_n$ on a puzzle $\mathcal{P}$ proceeds as follows:

For each i from 1 to n:
    For each area a of $\mathcal{P}$ such that the pattern of $s_i$ matches a:
        1. apply $s_i$ to a
        2. if the application of $s_i$ to a failed, then terminate the entire execution and report failure Example. Let us consider in detail the execution of the program in FIG. 9(a) on the puzzle in FIG. 9(b). The first statement has a pattern which matches only the first area of the puzzle. So, we apply the first statement to the first area, which succeeds and results in the following puzzle in FIG. 9(c). The second statement has a pattern which matches only the second area of the puzzle. So, we apply the second statement to the second area. The second statement is a conditional statement, so we first apply the first rule of the second statement. That rule fails because the pieces needed by the strategy of that rule are not available. We then move on to apply the second rule of the second statement. That rule succeeds and completes the puzzle.

Time Complexity. We can implement the application of a rule to an area in constant time, using known techniques based on algorithms and data structures. A program executes o(1) rules on each area of a board. So, the execution of a program on a board with K areas takes o(K) time.

FIG. 10 shows our puzzle solving program, which has 15 numbered statements. Notice that the 15 statements have pairwise different patterns; each statement completes the areas with a particular pattern. While our program may appear simple, the ordering of the statements and the ordering of the rules in conditional statements are in several (but not all) cases crucial for correctness.

We have discovered and proved: Theorem (Correctness) A type-1 puzzle is solvable if and only if our program succeeds on the puzzle.

For an elementary program P, we generate |P| puzzles, each of which we can solve in linear time in the number of registers. Therefore, we have discovered and proved: Theorem (Complexity) Spill-free register allocation with pre-coloring for an elementary program P and 2K registers is solvable in o(|P|×K) time.

A solution for the collection of puzzles in FIG. 11(a) is shown in FIG. 11(b). For simplicity, the puzzles in FIG. 11 are not padded.

Spilling and Coalescing

In a graph with a start node, a node d dominates a node n if every path from the start node to n must go through d. A node d strictly dominates a node n if d dominates n and d does not equal n. The immediate dominator of a node n is the unique node that strictly dominates n but does not strictly dominate any other node that strictly dominates n. A dominator tree is a tree where each node's children are those nodes it immediately dominates.

To traverse a nonempty binary tree in preorder, perform the following operations recursively at each node, starting with the root node: (1) Visit the root. (2) Traverse the left subtree. (3) Traverse the right subtree.

We now present our combined approach to puzzle solving, spilling, and coalescing:
1. S=empty
2. For each puzzle p, in a preorder traversal of the dominator tree of the program:
    (a) while p is not solvable:
        choose and remove a piece s from p, and for every subsequent puzzle p' that contains a variable s' in the family of s, remove s' from p'.
    (b) S=a solution of p, guided by S Spilling. If our polynomial-time algorithm for puzzle solving succeeds, then all the variables in the program from which the puzzles were generated can be placed in registers. However, the algorithm may fail, implying that the need for registers exceeds the number of available registers. In that situation, the register allocator faces the task of choosing which variables will be placed in registers and which variables will be spilled, that is, placed in memory. The goal is to spill as few variables as possible.

Puzzle solving is independent of spilling, that is, puzzle solving can be combined with a wide variety of approaches to spilling.

In our experiments, we use a simple spilling heuristic. The heuristic is based on the observation that when we convert a program P into elementary form, each of P's variables is represented by a family of variables in the elementary program. For example, the variable c in FIG. 4(a) is represented by the family of variables $\{c_{23}, c_3, c_4, c_{67}, c_7, c_8, c_9\}$ in FIG. 4(b). When we spill a variable in an elementary program, we choose to simultaneously spill all the variables in its family and thereby reduce the number of pieces in many puzzles at the same time. The pseudo-code described above for our combined approach to puzzle solving, spilling, and coalescing contains a while-loop that implements our heuristic for spilling. The heuristic visits each puzzle once, it always terminates, and when it terminates, all puzzles have been solved.

When we choose and remove a piece s from a puzzle p, we use the "furthest-first" strategy of Belady [3] that was later used by Poletto and Sarkar [15] in linear-scan register allocation. The furthest-first strategy spills a family of variables whose live ranges extend the furthest, according to a linearization determined by a depth first traversal of the dominator tree of the source program. We do not give preference to any path. Giving preference to a path would be particularly worthwhile when profiling information is available.

The total number of puzzles that will be solved during a run of our heuristic is bounded by $|\mathcal{P}| + |\mathcal{F}|$, where $|\mathcal{P}|$ denotes the number of puzzles and $|\mathcal{F}|$ denotes the number of families of variables, that is, the number of variables in the source program.

Coalescing. Traditionally, the task of register coalescing is to assign the same register to the variables x, y in a copy statement x=y, thereby avoiding the generation of code for that statement. An elementary program contains many parallel copy statements and therefore many opportunities for a form of register coalescing. We use an approach that we call local coalescing. The goal of local coalescing is to allocate variables in the same family to the same register, as much as possible. Local coalescing traverses the dominator tree of the elementary program in preorder and solves each puzzle guided by the solution to the previous puzzle. In FIG. 11(b), the numbers next to each puzzle denote the order in which the puzzles were solved.

The preordering has the good property that every time a puzzle corresponding to statement i is solved, all the families of variables that are defined at program points that dominate i have already been given at least one location. The puzzle solver can then try to assign to the piece that represents variable v the same register that was assigned to other variables in v's family. For instance, in FIG. 4(b), when solving the puzzle formed by variables $\{A_3, c_3\}$, the puzzle solver tries to match the registers assigned to $A_2$ and $A_3$. This optimization is possible because $A_2$ is defined at a program point that dominates the definition site of $A_3$, and thus is visited before.

During the traversal of the dominator tree, the physical location of each live variable is kept in a vector. If a spilled variable is reloaded when solving a puzzle, it stays in a register until another puzzle, possibly many instructions after the reloading point, forces it to be evicted again.

FIG. 11(c) shows the assembly code produced by the puzzle solver for our running example. We have highlighted the instructions used to implement parallel copies. The x86 instruction cxhg swaps the contents of two registers.

Optimizations

We now describe three optimizations that we have found useful in our implementation of register allocation by puzzle solving.

Size of the intermediate representation. An elementary program has many more variable names than an ordinary program; fortunately, we do not have to keep any of these extra names. Our solver uses only one puzzle board at any time: given an instruction i, variables alive before and after i are renamed when the solver builds the puzzle that represents i. Once the puzzle is solved, we use its solution to rewrite i and we discard the extra names. The parallel copy between two consecutive instructions $i_1$ and $i_2$ in the same basic block can be implemented right after the puzzle representing i2 is solved.

Critical Edges and Conventional SSA-form. Before solving puzzles, our algorithm performs two transformations in the target control flow graph that, although not essential to the correctness of our allocator, greatly simplify the elimination of φ-functions and π-functions. The first transformation, commonly described in compiler text books, removes critical edges from the control flow graph. These are edges between a basic block with multiple successors and a basic block with multiple predecessors [6]. The second transformation converts the target program into a variation of SSA-form called Conventional SSA-form (CSSA) [18]. Programs in this form have the following property: if two variables $v_1$ and $v_2$ are related by a parallel copy, e.g.: $(\ldots, v_1, \ldots) = (\ldots v_2, \ldots)$, then the live ranges of $v_1$ and $v_2$ do not overlap. Hence, if these variables are spilled, the register allocator can assign them to the same memory slot. A fast algorithm to perform the SSA-to-CSSA conversion is given in [7]. These two transformations are enough to handle the 'swap' and 'lost-copy' problems pointed out by Briggs et al. [6].

Implementing φ-functions and π-functions. The allocator maintains a table with the solution of the first and last puzzles solved in each basic block. These solutions are used to guide the elimination of φ-functions and π-functions. During the implementation of parallel copies, the ability to swap register values is important [5]. Some architectures, such as x86, provide instructions to swap the values in registers. In systems where this is not the case, swaps can be performed using xor instructions.

Experimental Results

Experimental platform. We have implemented our register allocator in the LLVM compiler framework [14], version 1.9. LLVM is the just-in-time compiler in the openGL stack of Mac OS 10.5. Our tests are executed on a 32-bit x86 Intel(R) Xeon(™), with a 3.06 GHz cpu clock, 3 GB of free memory (as shown by the linux command free) and 512 KB L1 cache running Red Hat Linux 3.3.3-7.

Benchmark characteristics. The LLVM distribution provides a broad variety of benchmarks: our implementation has compiled and run over 1.3 million lines of C code. LLVM 1.9 and our puzzle solver pass the same suite of benchmarks. In this section we will present measurements based on the SPEC CPU2000 benchmarks. Some characteristics of these benchmarks are given in FIG. 12. All the figures use short names for the benchmarks; the full names are given in FIG. 12. We order these benchmarks by the number of nonempty puzzles that they produce, which is given in FIG. 14.

Puzzle characteristics. FIG. 13 counts the types of puzzles generated from SPEC CPU2000. A total of 3.45% of the puzzles have pieces of different sizes plus pre-colored areas so they exercise all aspects of the puzzle solver. Most of the puzzles are simpler: 5.18% of them are empty, i.e., have no pieces; 58.16% have only pieces of the same size, and 83.66% have an empty board with no pre-colored areas. Just 226 puzzles contained only short pieces with precolored areas and we omit them from the chart.

As we show in FIG. 14, 94.6% of the nonempty puzzles in SPEC CPU2000 can be solved in the first try. When this is not the case, our spilling heuristic allows for solving a puzzle multiple times with a decreasing number of pieces until a solution is found. FIG. 14 reports the average number of times that the puzzle solver had to be called per nonempty puzzle. On average, we solve each nonempty puzzle 1.05 times.

Number of moves/swaps inserted by the puzzle solver. FIG. 15 shows the number of copy and swap instructions inserted by the puzzle solver in each of the compiled benchmarks. Local copies denote instructions used by the puzzle solver to implement parallel copies between two consecutive puzzles inside the same basic block. Global copies denote instructions inserted into the final program during the SSA-elimination phase in order to implement φ-functions and π-functions. Target programs contains one copy or swap per each 14.7 puzzles in the source program, that is, on average, the puzzle solver has inserted 0.025 local and 0.043 global copies per puzzle.

Compile-time and run-time comparison. Our experiments show that our puzzle-based allocator runs as fast as the algorithm used in an industrial-strength just-in-time compiler and that our puzzle-based allocator produces code that is competitive with state-of-the-art algorithms. Generally, either a compiler is fast and produces slow code, or it is slow and produces fast code. A compiler that uses register allocation by puzzle solving can both be fast and produce competitive code.

An embodiment of the invention may be a machine-readable medium having stored thereon instructions which cause a programmable processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing information in a form readable by a machine (e.g., a computer), including but not limited to Compact Disc Read-Only Memory (CD-ROM), Read-Only Memory (ROM), Random Access Memory (RAM), and Erasable Programmable Read-Only Memory (EPROM).

The applications of the present invention have been described largely by reference to specific examples and in terms of particular allocations of functionality to certain hardware and/or software components. However, those of skill in the art will recognize that register allocation can also be made by software and hardware that distribute the functions of embodiments of this invention differently than herein described. Such variations and implementations are understood to be made without departing from the broader spirit and scope of the invention as set forth in the following claims. The specification and drawings are, accordingly, to be regarded in an illustrative sense rather than a restrictive sense.

REFERENCES

[1] Scott Ananian. The static single information form. Master's thesis, MIT, September 1999.

[2] Andrew W. Appel and Lal George. Optimal spilling for CISC machines with few registers. In *PLDI*, pages 243-253. ACM Press, 2001.

[3] L. Belady. A study of the replacement of algorithms of a virtual storage computer. *IBM System Journal*, 5:78-101, 1966.

[4] Rastislav Bodik, Rajiv Gupta, and Vivek Sarkar. ABCD: eliminating array bounds checks on demand. In *PLDI*, pages 321-333, 2000.

[5] Florent Bouchez, Alain Darte, Christophe Guillon, and Fabrice Rastello. Register allocation: What does the np-completeness proof of chaitin et al. really prove? or revisiting register allocation: Why and how. In *LCPC, pages* 283-298, 2006.

[6] Preston Briggs, Keith D. Cooper, Timothy J. Harvey, and L. Taylor Simpson. Practical improvements to the construction and destruction of static single assignment form. *SPE*, 28(8):859-881, 1998.

[7] Zoran Budimlic, Keith D. Cooper, Timothy J. Harvey, Ken Kennedy, Timothy S. Oberg, and Steven W. Reeves. Fast copy coalescing and live-range identification. In *PLDI*, pages 25-32. ACM Press, 2002.

[8] Ron Cytron, Jeanne Ferrante, Barry K. Rosen, Mark N. Wegman, and F. Kenneth Zadeck. Efficiently computing static single assignment form and the control dependence graph. *TOPLAS*, 13(4):451-490, 1991.

[9] Lal George and Andrew W. Appel. Iterated register coalescing. *TOPLAS*, 18(3):300-324, 1996.

[10] Daniel Grund and Sebastian Hack. A fast cutting-plane algorithm for optimal coalescing. In *Compiler Construction*, volume 4420, pages 111-115. Springer, 2007.

[11] Lang Hames and Bernhard Scholz. Nearly optimal register allocation with PBQP. In *JMLC*, pages 346-361. Springer, 2006.

[12] Richard Johnson and Keshav Pingali. Dependence-based program analysis. In *PLDI*, pages 78-89, 1993.

[13] David Ryan Koes and Seth Copen Goldstein. A global progressive register allocator. In *PLDI*, pages 204-215. ACM Press, 2006.

[14] Chris Lattner and Vikram Adve. LLVM: A compilation framework for lifelong program analysis & transformation. In *CGO*, pages 75-88, 2004.

[15] Massimiliano Poletto and Vivek Sarkar. Linear scan register allocation. *TOPLAS*, 21(5):895-913, 1999.

[16] Bernhard Scholz and Erik Eckstein. Register allocation for irregular architectures. In *SCOPES*, pages 139-148. LCTES, 2002.

[17] Michael D. Smith, Norman Ramsey, and Glenn Holloway. A generalized algorithm for graph-coloring register allocation. In *PLDI*, pages 277-288, 2004.

[18] Vugranam C. Sreedhar, Roy Dz ching Ju, David M. Gillies, and Vatsa Santhanam. Translating out of static single assignment form. In *SAS*, pages 194-210. Springer-Verlag, 1999.

What is claimed is:

1. A computer-implemented method for register allocation, the method comprising:
   transforming a computer program into an elementary program;
   transforming the elementary program into a collection of puzzles;
   modeling a register file as a puzzle board divided in a plurality of separate and non-overlapping areas;
   modeling variables of the elementary program as puzzle pieces of a plurality of heights and widths, with some of the puzzle pieces immovably placed on the puzzle board; and
   solving each puzzle by placing the remaining puzzle pieces on the puzzle board by completing one area of the puzzle board at a time, wherein the placement of the puzzle pieces on the puzzle board models the allocation of registers in the register file to the variables of the elementary program.

2. The method of claim 1, wherein each area contains two-by-N squares, where N is two to the power of a nonnegative integer.

3. The method of claim 1, wherein each variable is mapped to one of the puzzle pieces, the live range of the variable determines the height of the piece, and the bit-width of the variable determines the width of the piece.

4. The method of claim 1, wherein the live range of each variable determines whether a corresponding piece is to be placed in a top row, a bottom row, or across both rows of an area.

5. The method of claim 1, wherein solving a puzzle in which each area contains two-by-two squares, the method further comprising:
   executing a sequence of statements, wherein each statement comprises one or more rules, and each rule explains how to complete an area.

6. The method of claim 5, wherein each rule is a two-by-two diagram with two facets, the two facets comprising:
   a pattern, defined as a description of which squares contain immovably placed puzzle pieces for the rule to apply, and
   a strategy, defined as a description of how to complete the area, including which puzzle pieces to use and on which squares to put the puzzle pieces.

7. The method of claim 1, wherein the method for register allocation is independent of the choice of a spilling method, wherein the spilling method chooses which variables are to be placed in registers and which variables are to be placed in memory, when the need for registers exceeds the number of available registers.

8. The method of claim 1, wherein the method for register allocation uses local coalescing to avoid generating code for copy statements, wherein local coalescing comprises:
   traversing a dominator tree of the elementary program in pre-order to determine a sequence of the puzzles; and
   solving each puzzle in the sequence guided by a solution to a predecessor puzzle in the sequence.

9. A non-transitory computer-readable storage medium including instructions that, when executed by a processing system, cause the processing system to perform a method for register allocation, the method comprising:
   transforming a computer program into an elementary program;
   transforming the elementary program into a collection of puzzles;
   modeling a register file as a puzzle board divided in a plurality of separate and non-overlapping areas;
   modeling variables of the elementary program as puzzle pieces of a plurality of heights and widths, with some of the puzzle pieces immovably placed on the puzzle board; and
   solving each puzzle by placing the remaining puzzle pieces on the puzzle board by completing one area of the puzzle board at a time, wherein the placement of the puzzle pieces on the puzzle board models the allocation of registers in the register file to the variables of the elementary program.

10. The non-transitory computer-readable storage medium of claim 9, wherein each area contains two-by-N squares, where N is two to the power of a nonnegative integer.

11. The non-transitory computer-readable storage medium of claim 9, wherein each variable is mapped to one of the puzzle pieces, the live range of the variable determines the height of the piece, and the bit-width of the variable determines the width of the piece.

12. The non-transitory computer-readable storage medium of claim 9, wherein the live range of each variable determines whether a corresponding piece is to be placed in a top row, a bottom row, or across both rows of an area.

13. The non-transitory computer-readable storage medium of claim 9, wherein solving a puzzle in which each area contains two-by-two squares, the method further comprising:
   executing a sequence of statements, wherein each statement comprises one or more rules, and each rule explains how to complete an area.

14. The non-transitory computer-readable storage medium of claim 13, wherein each rule is a two-by-two diagram with two facets, the two facets comprising:
   a pattern, defined as a description of which squares contain immovably placed puzzle pieces for the rule to apply, and
   a strategy, defined as a description of how to complete the area, including which puzzle pieces to use and on which squares to put the puzzle pieces.

15. The non-transitory computer-readable storage medium of claim 9, wherein the method for register allocation is independent of the choice of a spilling method, wherein the spilling method chooses which variables are to be placed in registers and which variables are to be placed in memory, when the need for registers exceeds the number of available registers.

16. The non-transitory computer-readable storage medium of claim 9, wherein the method for register allocation uses local coalescing to avoid generating code for copy statements, wherein local coalescing comprises:
   traversing a dominator tree of the elementary program in pre-order to determine a sequence of the puzzles; and
   solving each puzzle in the sequence guided by a solution to a predecessor puzzle in the sequence.

* * * * *